United States Patent
Wittebrood

(10) Patent No.: US 8,158,273 B2
(45) Date of Patent: Apr. 17, 2012

(54) ALUMINIUM ALLOY BRAZING SHEET PRODUCT

(75) Inventor: Adrianus Jacobus Wittebrood, Velserbroek (NL)

(73) Assignee: Aleris Aluminum Koblenz GmbH, Koblenz (DE)

( * ) Notice: Subject to any disclaimer, the term of this patent is extended or adjusted under 35 U.S.C. 154(b) by 248 days.

(21) Appl. No.: 12/600,462

(22) PCT Filed: Jun. 12, 2008

(86) PCT No.: PCT/EP2008/004732
§ 371 (c)(1),
(2), (4) Date: Jan. 4, 2010

(87) PCT Pub. No.: WO2008/155067
PCT Pub. Date: Dec. 24, 2008

(65) Prior Publication Data
US 2010/0151273 A1 Jun. 17, 2010

Related U.S. Application Data

(60) Provisional application No. 60/946,417, filed on Jun. 27, 2007.

(30) Foreign Application Priority Data

Jun. 20, 2007 (EP) ..................................... 07012061

(51) Int. Cl.
*B32B 15/20* (2006.01)
*B23K 35/28* (2006.01)
*F28F 21/08* (2006.01)

(52) U.S. Cl. .................... 428/654; 165/905; 228/262.51
(58) Field of Classification Search ........................ None
See application file for complete search history.

(56) References Cited

U.S. PATENT DOCUMENTS

| 3,891,400 A | 6/1975 | Robinson |
| 3,917,151 A | 11/1975 | Robinson |
| 4,489,140 A | 12/1984 | Pulliam et al. |

(Continued)

FOREIGN PATENT DOCUMENTS

| EP | 1 306 207 A1 | 5/2003 |
| EP | 1 430 988 A1 | 6/2004 |
| WO | 2005/061743 A1 | 7/2005 |

OTHER PUBLICATIONS

Margareta Nylen et al.,-"Mechanistic Studies of Brazing in Clad Aluminum Alloys", Materials Science Forum, vol. 217-222, 1996, pp. 1703-1708.

*Primary Examiner* — John J Zimmerman
(74) *Attorney, Agent, or Firm* — Novak Druce + Quigg, LLP

(57) ABSTRACT

The invention relates to an aluminum alloy brazing sheet including: a thin covering material layer, a core material layer, and an Al—Si alloy brazing material layer as an intermediate material interposed between the thin covering material and the core material. The thin covering material and the core material being of aluminum alloys having a solidus temperature higher than a liquidus temperature of the brazing material so that the molten brazing material seeps onto a surface of the thin covering material when the brazing material is molten in a brazing operation. The Al—Si alloy brazing material contains from 0.01 to 0.09% mg, and the aluminum alloy brazing sheet has a total Mg-content of less than 0.06%.

20 Claims, 1 Drawing Sheet

U.S. PATENT DOCUMENTS

| | | | |
|---|---|---|---|
| 5,069,980 A * | 12/1991 | Namba et al. | 428/654 |
| 6,635,360 B2 | 10/2003 | Takeno et al. | |
| 6,896,977 B2 | 5/2005 | Nishimura et al. | |
| 2003/0064242 A1 | 4/2003 | Wittebrood et al. | |
| 2003/0098338 A1 * | 5/2003 | Dockus et al. | 228/122.1 |
| 2003/0099856 A1 | 5/2003 | Takeno et al. | |
| 2004/0038070 A1 * | 2/2004 | Dockus et al. | 428/652 |
| 2004/0238605 A1 | 12/2004 | Nishimura et al. | |
| 2007/0122648 A1 * | 5/2007 | Vieregge et al. | 428/654 |
| 2007/0158386 A1 | 7/2007 | Dulac et al. | |

* cited by examiner

US 8,158,273 B2

ALUMINIUM ALLOY BRAZING SHEET PRODUCT

This application is a §371 National Stage Application of International Application No. PCT/EP2008/004732, filed on 12 Jun. 2008, claiming the priority of European Patent Application No. 07012061.3 filed on 20 Jun. 2007 and U.S. Provisional Application No. 60/946,417 filed 27 Jun. 2007.

FIELD OF THE INVENTION

The present invention relates to an aluminium alloy brazing sheet product comprising a thin covering material layer, a core material layer, and further an Al—Si alloy brazing material layer as an intermediate material interposed between the thin covering material and the core material. The thin covering material and the core material are comprised of aluminium alloys having a solidus temperature higher than a liquidus temperature of the brazing material so that the molten brazing material during a subsequent brazing operation at a temperature between said liquidus temperature and said solidus temperature is to cause said Al—Si alloy brazing material layer to melt down while keeping said thin covering material layer solid to present oxidation of the brazing material being melted, and then cause the Al—Si alloy brazing material to, due to volumetric expansion, seep through segregation portions of said thin covering material layer onto a surface of said thin covering material layer and spread over the surface of said thin covering material to form an emerging surface resulting in a brazed joint.

The invention further relates to a brazed assembly manufactured in a brazing operation, the brazed assembly comprising various components and at least one component being made from the aluminium alloy brazing sheet according to this invention.

BACKGROUND TO THE INVENTION

As will be appreciated herein below, except as otherwise indicated, alloy designations and temper designations refer to the Aluminum Association designations in Aluminum Standards and Data and the Registration Records, as published by the Aluminum Association in 2007 as well known to the skilled person.

For any description of alloy compositions or preferred alloy compositions, all references to percentages are by weight percent unless otherwise indicated.

Substrates of aluminium or aluminium alloy in the form of sheet or extrusion, are used to make shaped or formed products. In some of these processes parts of (shaped) aluminium comprising substrates are interconnected. One end of a substrate may be interconnected with the other end, or one substrate may be assembled with one or more other substrates. This is commonly done by brazing. In a brazing process, a brazing filler metal or brazing alloy, or a composition producing a brazing alloy upon heating, is applied to at least one portion of the substrate to be brazed. After the substrate parts are assembled, they are heated until the brazing metal or brazing alloy melts. The melting point of the brazing material is lower than the melting point of the aluminium comprising substrate(s).

Brazing, by definition, employs a filler metal, also referred to as a brazing alloy, having a liquidus above 450° C. and below the solidus of the base metal. Brazing is distinguished from soldering by the melting point of the filler metal: solders melt below 450° C.

Brazing sheet products find wide applications in heat exchangers and other similar equipment. Conventional brazing products have a core of rolled sheet, typically, but not exclusively an aluminium alloy of the AA3000-series, having on at least one surface of the core sheet an aluminium clad layer (also known as an aluminium cladding layer). The aluminium clad layer is made of an AA4000-series alloy comprising silicon in an amount in the range of 2 to 18% by weight, and preferably in the range of 7 to 14% by weight. The aluminium clad layer may be coupled to the core alloy in various ways known in the art, for example by means of roll bonding, cladding spray-forming or semi-continuous or continuous casting processes. These aluminium clad layers have a liquidus temperature typically in the range of 540 to 610° C.

There are various brazing processes in use for the industrial scale manufacturing of heat exchangers.

There is vacuum brazing ("VB") which is carried out at relatively low atmosphere pressure in the order of about $1.10^{-5}$ mbar or less. To obtain the optimum conditions for joining to take place, alloys commonly used for vacuum brazing contain purposive additions of Mg of 1% or more. The Mg destroys the hard oxide film of the filler alloy when it evaporates from the brazing sheet during brazing, and further the evaporated Mg plays the role as getter that removes oxygen and moisture remaining in the brazing furnace.

Another brazing process is controlled atmosphere brazing ("CAB") which is carried out in a dry no oxygen containing atmosphere, preferably using the inert environment of nitrogen, but for example also argon can be used. To facilitate brazing a non-corrosive brazing flux is applied prior to brazing on the pieces to be joined. This brazing flux removes or at least brakes open during the brazing operation the always present oxide layer to allow the molten filler to come into contact with bare metal to form the joint. The aluminium alloys used for CAB should be free of Mg because any Mg is inhibiting the brazing flux action in removing the oxide layer.

Another brazing process is CAB without using a brazing flux, and this process is in particular being used for joining by means of brazing of surfaces inside a heat exchanger with are very difficult to flux. In European application EP-1430988 it is disclosed that for such a process of CAB without using a brazing flux that the brazing sheet product used contains Mg at least in a layer constituting the brazing sheet other than the filler alloy layer, typically the core alloy contains Mg in a range of 0.05 to 1.0 wt. %. Interposed between the core alloy and the filler alloy and diffusion prevention layer is present, such an a Mg-free AA3003-series aluminium alloy. More specifically, the brazing sheet has an aluminium core alloy clad on one or both sides with Al—Si based filler alloy, and has a cladding thickness "a" (µm) of the filler alloy applied on the inside of a hollow structure, a Mg content X (wt. %) of the core material, and a Mg-content Y (in wt. %) of the filler alloy to satisfy relationships of $(X+Y) \leq a/60+0.5$ and $X > Y$, with preferred stricter ranges.

European patent no. EP-1306207-B1 discloses another fluxless brazing process in an inert gas atmosphere containing a very low oxygen content of up to 1000 ppm, and preferably up to 500 ppm. Furthermore there is disclosed a brazing sheet product comprising of an aluminium core alloy on one or both sides clad with an Al—Si alloy brazing alloy containing 0.1 to 5% of Mg and 0.01 to 0.5% of Bi as an intermediate layer, and a thin covering material clad onto the Al—Si alloy brazing alloy. It is disclosed that during a brazing operation the brazing material in the intermediate layer is molten as the temperature is elevated during brazing, but oxidation of the surface of the brazing material does not occur because the surface is covered with the thin covering material which remains solid. When the temperature is further elevated, the portions with lower melting points, such as a segregation portion of the thin covering material close to the molten brazing material, are locally molten, and then the brazing material seeps and spreads over the surface of the thin covering material due to volumetric expansion. The surface of the brazing material then becomes an emerging face without an oxidation film, and new intensive oxidation does not proceed due to the inert gas atmosphere. Gradually also the thin covering layer melts also in whole or in part. It is mentioned further, that because no thick oxidation film exists, the molten brazing material wettingly spreads even in the absence of brazing flux and Mg. Sufficient amounts of Mg and Bi within the claimed ranges should be used as they are said to consume oxygen in a proximal atmosphere and prevent oxidation of the surface of the molten brazing and the molten thin covering material.

There is a need for further improved brazing sheet and brazing processes by which the interior side of an assembly has not to be provided with a brazing flux.

SUMMARY OF THE INVENTION

It is an object of the invention to provide an alternative aluminium alloy brazing sheet product that can be applied in a controlled atmosphere fluxless brazing process.

It is another object of the invention to provide an aluminium alloy brazing sheet product that can be applied in a controlled atmosphere fluxless brazing process as well as in a controlled atmosphere brazing process with a brazing flux.

These and other objects and further advantages are met or exceeded by the present invention providing an aluminium alloy brazing sheet product comprising: a thin covering material layer which is Mg free, a core material layer, and an Al—Si alloy brazing material layer as an intermediate material interposed between said covering aluminium material layer and said core material layer, wherein said thin covering material layer and said core material layer being comprised of aluminium alloys having a solidus temperature higher than a liquidus temperature of said brazing material so that the molten brazing material seeps onto a surface of said thin covering material when said brazing material is molten in a brazing operation, and wherein said Al—Si alloy brazing material layer contains from 0.01 to 0.09% Mg, and preferably about 0.02 to 0.08%, and more preferably about 0.02 to 0.06%, and wherein the aluminium alloy brazing sheet has a total Mg-content of less than 0.06%, and preferably less than 0.04%.

DETAILED DESCRIPTION OF THE PREFERRED EMBODIMENTS

Figure 1A:
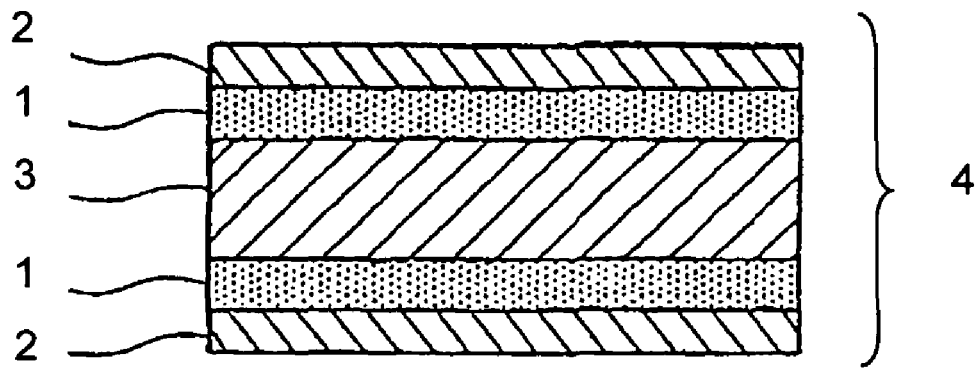
FIGS. 1A, 1B and 1C illustrate typical arrangements of the aluminium alloy brazing sheet product according to the invention.

As stated above, the present invention provides an aluminium alloy brazing sheet product comprising: a thin covering material layer which is Mg-free, a core material layer, and an Al—Si alloy brazing material layer as an intermediate material interposed between said thin covering material layer and said core material layer, wherein said thin covering material and said core material being comprised of aluminium alloys having a solidus temperature higher than a liquidus temperature of said brazing material so that the molten brazing material seeps onto a surface of said thin covering material when said brazing material is molten in a brazing operation, and wherein said Al—Si alloy brazing material layer contains from 0.01 to 0.09% Mg, and preferably about 0.02 to 0.08%, and more preferably about 0.02 to 0.06%, and wherein the aluminium alloy brazing sheet has a total Mg-content of less than 0.06%, and preferably less than 0.04%.

It is important for the invention that the total amount of Mg in the aluminium alloy brazing sheet product, thus the sum of the Mg in the core alloy layer and the Al—Si alloy brazing material layer and the covering material layer, is being controlled such that it does not exceed about 0.05%, and preferably is less than about 0.03%. At present the quality and control mechanisms when producing aluminium brazing sheet allow for the target and the control of Mg within an accuracy of ±0.01% or better.

In accordance with the invention it has been found that by the purposive addition of Mg to the AlSi brazing material and careful control of the overall Mg-content in the aluminium alloy brazing sheet product, the brazing sheet product can be used successfully in a controlled atmosphere brazing process without the use of a brazing flux. As a result this brazing sheet product according to this invention is a very attractive candidate for application in brazed assemblies having one or more inner surfaces which are difficult to flux. Surprisingly, it has been found, despite the use of Mg additions which are normally not desirable for the flux brazing processes such as NOCOLOK (trademark), that the brazing sheet product according to this invention can be brazed in a controlled atmosphere brazing process while applying a brazing flux. This makes the brazing sheet product a very attractive candidate for the production of for example brazed oil coolers. Oil coolers are commonly built up from plates which have to braze internally and externally. Due to the long brazing cycle it is necessary to flux the outside of the oil cooler to facilitate brazing. Long brazing cycles would give otherwise excessive oxidation even in a controlled atmosphere environment, thereby reducing the capability to form reliable joints. The applied brazing flux reduces significantly the degree of oxidation. Also, with the brazing sheet product according to this invention good brazed joint are obtained at inner surfaces without the requirement of applying a brazing flux.

The aluminium alloy brazing sheet product according to the invention has a typical thickness in the range of about 0.05 to 4 mm.

In the aluminium alloy brazing material used in the invention and interposed between the thin covering material layer and the core material layer, the amount of Si is selected in a conventional manner, to provide the desired brazing properties of the alloy. The Si content is in a range of 5 to 16.5%, and preferably in a range of 5 to 14%.

The amount of Fe present in the brazing material depends primarily on the origin of the alloy material and can be up to about 0.8%, and preferably is not more than about 0.6%. As grain refiner element Ti can be present in the brazing material in a range of up to 0.2%, preferably up to 0.15%. The balance is made by unavoidable impurities and aluminium.

In an embodiment Mn can be present in the brazing material layer in the range of about 0.2 to 0.8% to improve on the corrosion resistance of the brazing sheet product. At a level below 0.2% the effect of improved corrosion resistance by the Mn addition is not found. Preferably the amount of Mn is at least 0.3% to provide improved corrosion resistance. With a view to the properties of the alloy, the amount of Mn should be not more than 1.0%, and a preferred maximum is 0.8%, since above this level the improved corrosion resistance may be less. In the embodiment where Mn is purposively added it is preferred that the Mn/Fe ratio in weight percent is at least 1, preferably at least 2.

In an embodiment the Al—Si alloy brazing material layer further contains one or more wetting elements selected from the group comprising Bi, Pb, Li, Sb, and Th, and wherein the total amount of the wetting elements is in a range of about 0.01 to 0.5%. In a preferred embodiment the element Bi is selected from the group of wetting elements and is in a range of about 0.01 to 0.5%, and preferably in a range of about 0.01 to 0.1%, as being the most efficient wetting element for this purpose in this alloy system during a brazing operation.

In the embodiment that Bi is added to the brazing material layer it is further preferred that excess Mg content with respect to stoichiometric composition of $Bi_2Mg_3$ is 0.07% or less, and preferably 0.05% or less. It has been found that Bi has a low solubility in aluminium and tends to separate out at the grain boundaries even when added at low levels of for example 0.1%. To overcome this a small amount of Mg will form $Bi_2Mg_3$ which stops separation at the grain boundaries. This $Bi_2Mg_3$ phase will however dissolve in the silicon clad alloy at melting of the brazing material releasing the Bi to lower the surface tension of the molten filler.

In an embodiment the Al—Si alloy brazing material layer further contains one or more elements selected from the group consisting of 0.1 to 5% of Zn, 0.01 to 0.5% of In, and 0.01 to 0.5% of Sn. These alloying elements improve the corrosion resistance of the core material by making the brazing material more sacrificial with respect to the core material. When the amount is less than the lower limit the sacrificial anode effect is not sufficient to produce the sacrificial anode effect, and when more than the upper limit is present it does not provide any further improvement on the corrosion resistance, whereas the alloy is more difficult to manufacture.

The core alloy layer can be any aluminium alloy used for core alloy in brazing sheet. It is preferred that the Mg-content is being controlled such that it is not more than about 0.03%, and more preferably not more than about 0.015%. In an embodiment the core alloy layer is an aluminium alloy containing not more than about 0.03% Mg.

In an embodiment the core alloy layer is an AA3000-series alloy having not more than about 0.03% Mg.

In another embodiment the core alloy layer is an aluminium alloy comprising, in wt. %:
Mn 0.5 to 2.0
Cu 0 to 1.2
Fe 0 to 1.0
Si 0 to 1.0
Bi 0 to 0.1
Ti 0 to 0.1
Mg 0 to 0.03, preferably 0 to 0.015,
other elements and inevitable impurities, each <0.05, total <0.2, balance aluminium.

In one particular embodiment of the brazing sheet product according to the invention the covering aluminium material layer is a thin covering material layer which is Mg-free, and the Al—Si alloy brazing material layer as an intermediate material is interposed between said thin covering material layer and said core material layer, and wherein said thin covering material layer and said core material layer comprised of aluminium alloys each have a solidus temperature higher than a liquidus temperature of said Al—Si alloy brazing material so that the molten brazing material during a subsequent brazing operation at a temperature between the liquidus temperature and the solidus temperature is to cause the Al—Si alloy brazing material layer to melt down while keeping the thin covering material layer solid to prevent oxidation of the brazing material being melted, and then cause the Al—Si alloy brazing material to, due to volumetric expansion, seep through segregation portions of the thin covering material layer onto a surface of the thin covering material layer and spread over the surface of the thin covering material to form an emerging surface resulting in a brazed joint.

The aluminium alloys having a solidus temperature higher than a liquidus temperature of the brazing material are used for the thin covering material and the core material. The temperature at which the brazing operation is carried out while using the brazing sheet product of this invention should be one at which the brazing material melts but the covering material alone does not, namely, a temperature higher than a liquidus temperature of the brazing material but lower than a solidus temperature of the thin covering material, normally in a range of about 540° C. to 610° C., and preferably in a range of about 560° C. to 605° C.

The thin covering material layer is an aluminium alloy being Mg-free to avoid the formation of an oxide layer during a brazing operation. In practical terms this would mean that Mg is present at a very low level of an impurity or incidental element, typically <0.05%, and ideally at a level of <0.01%, and preferably <0.007%. More preferably the aluminium alloy is substantially free of Mg. With "substantially free" is meant that no purposeful addition of Mg was made to the chemical composition but that due to impurities and/or leaking from contact with manufacturing equipment, trace quantities of Mg may nevertheless find their way into the aluminium alloy product.

In an embodiment the thin covering material layer is an Mg-free aluminium alloy comprising, in wt. %,
Fe 0 to 0.5
Si 0 to 4.0, preferably 0 to 1.0,
Mn 0 to 1.0
Cu 0 to 0.5
Zn 0 to 0.25
Ti 0 to 0.1
other elements and inevitable impurities, each <0.05, total <0.15, balance aluminium.

In another embodiment the thin covering material layer is an Mg-free aluminium alloy having a composition within the range of AA1000-series aluminium alloys, and preferably an aluminium alloy selected from the group comprising AA1050, AA1070, AA1100, AA1145, and AA1230.

In an embodiment the thin covering material layer has a thickness which is about 0.1 to 10% of the entire thickness of the aluminium alloy brazing sheet, and the Al—Si alloy brazing material layer has a thickness which is about 5 to 30% of the entire thickness of the aluminium alloy brazing sheet.

Also, in a preferred embodiment the thickness ratio of the Al—Si alloy brazing material layer and the thin covering material layer is 4 or more:1, for example the thickness ratio is 4:1 or about 5:1.

In a further aspect of the invention there is provided a brazed assembly of components, for example a heat-exchanger, incorporating at least the aluminium alloy brazing sheet according to this invention as one of the components. A typical example of a heat-exchanger benefiting for the aluminium alloy brazing sheet according to this invention is an oil cooler.

In another aspect of the invention there is provided a method of manufacturing an assembly of brazed components, comprising the steps of:
(a) forming the components of which at least one is made from an aluminium alloy brazing sheet as set out above;
(b) assembling the components into an assembly;

(c) brazing the assembly without applying flux in an inert gas atmosphere at a brazing temperature for a period long enough for melting and spreading of the filler material;

(d) cooling the brazed assembly, typically to below 100° C.

Ideally, when assembling the components into an assembly suitable for joining by brazing, one side of the brazing sheet of the invention having the thin covering material layer is being kept inside the assembly forming the brazing sheet to constitute a hollow structure. While using the brazing sheet product according to this invention there is no need to apply a flux in order to obtain a good joint with the brazing operation.

In another aspect of the invention there is provided a method of manufacturing an assembly of brazed components, comprising the steps of:

(a) forming the components of which at least one is made from an aluminium alloy brazing sheet as set out above;

(b) assembling the components into an assembly, and wherein one side of the brazing sheet of the invention having the thin covering material layer is being kept inside the assembly forming the brazing sheet to constitute a hollow structure;

(c) brazing the assembly without applying flux in the hollow structure and applying a flux on at least part of the outside of the assembly of components and brazing the whole assembly in an inert gas atmosphere at a brazing temperature for a period long enough for melting and spreading of the filler material;

(d) cooling the brazed assembly, typically to below 100° C.

The invention will now be illustrated with reference to non-limiting figures and embodiments according to the invention.

Figure 1B:
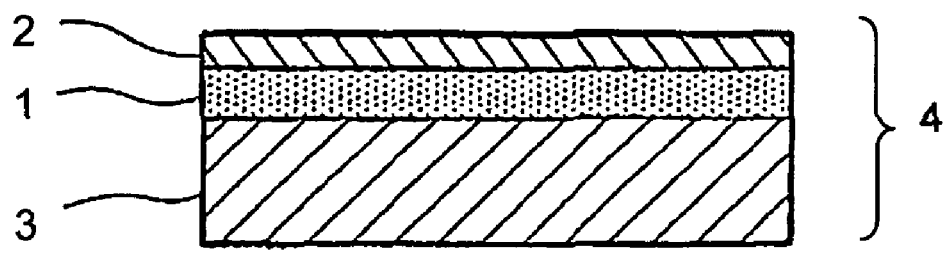
Figure 1C:
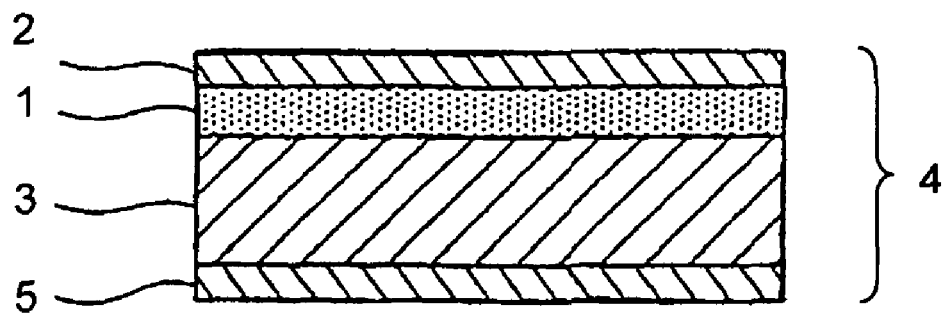

Typical arrangements of the aluminium alloy brazing sheet product according to the invention are illustrated in FIGS. 1A, 1B and 1C.

The covering material layer (2) and the intermediate brazing material layer (1) can be applied on both sides of or on one side of the core material layer (3). When both sides are clad, the brazing sheet product comprises five layers including the core alloy layer as shown in FIG. 1A. When one side is clad with the brazing material, the brazing sheet product comprises a three layer configuration as shown in FIG. 1B.

In another embodiment, when one side is clad with the brazing material, on the other side of the core material an outerlayer (5) can be applied as shown in FIG. 1C. The outerlayer or outerliner would generally be of an alloy tailored to provide high corrosion resistance or even corrosion combined with erosion resistance in the environment to which that face of the sheet is exposed. An example of a suitable outerliner would be an aluminium alloy having a purposive addition of Zn, such as for example an AA7072-series alloy.

In another embodiment, a further aluminium alloy layer can be interposed between the core alloy layer (3) and the intermediate brazing material layer (1). For example such a further aluminium alloy layer may be applied for example to limit diffusion of alloying element from the core layer to the brazing layer, or to further improve on the corrosion performance of the brazing sheet product.

EXAMPLE 1

Core sheet of 45 mm has been produced from small ingots which have been pre-heated at 430° C. and then hot rolled to 45 mm. Brazing material sheet has been produced from small ingots which have been pre-heated to 430° C. and hot rolled to 5 mm, and then cold rolled to 4 mm. Also, thin covering material has been produced from small ingots which have been pre-heated to 430° C. and then hot rolled, and then cold rolled to 1 mm.

Three layer brazing sheet products having the configuration of FIG. 1B have been manufactured by placing on a 45 mm core sheet a 4 mm layer of brazing material and onto the brazing material a thin covering material of 1 mm. The 50 mm thick product was then for 3 hours pre-heated at 430° C., then hot rolled to 3 mm and then cold rolled to 1 mm. The 1 mm brazing sheet product was annealed for 2 hours at 350° C. and thereafter the brazeability was assessed.

Using the procedure set out above various brazing sheet products have been manufactured using variable chemical combinations of the core alloy and the brazing material. The alloy composition of the various layer are listed in Table 1 and the combinations of the brazing sheet products are listed in Table 2.

The brazeability of the brazing sheet products have been assessed on a laboratory scale of testing in a small quartz furnace. Small coupons of 25 mm×25 mm were cut from the brazing sheet products. A small strip of an AA3003 alloy measuring 30 mm×7 mm×1 mm was bent in the centre to an angle of 45° and laid on the coupons. The strip on the coupon samples were heated under flowing nitrogen, with heating from room temperature to 590° C., dwell time at 590° C. for 1 minute, cooling from 590° C. to room temperature. The brazed samples were assessed for the amount of fillet formed at the periphery of the AA3003 in contact with the brazing sheet products and expressed in %, for example if no fillet was formed then the amount of fillet is 0%, and when a fillet is formed around the whole periphery the amount of fillet is 100%. The results are listed in Table 2.

TABLE 1

Chemical composition of the various layers tested, balance is aluminium and unavoidable impurities.

| Layer no. | Type of layer | Alloying element, in wt. % | | | | | | |
|---|---|---|---|---|---|---|---|---|
| | | Fe | Si | Mg | Cu | Mn | Bi | Ti |
| A | Thin covering material | 0.3 | 0.5 | — | — | — | — | — |
| B1 | Core material | 0.4 | 0.55 | — | 0.7 | 1.2 | — | — |
| B2 | Core material | 0.25 | 0.1 | 0.2 | 0.5 | 1.0 | — | — |
| C1 | Brazing material | 0.3 | 12.7 | — | — | — | — | — |
| C2 | Brazing material | 0.3 | 12.7 | 0.10 | — | — | — | — |
| C3 | Brazing material | 0.3 | 12.7 | 0.08 | — | — | 0.09 | — |
| C4 | Brazing material | 0.3 | 12.7 | 0.08 | — | — | 0.09 | 0.1 |

TABLE 2

Brazeability test in controlled atmosphere without using a flux and expressed as the amount of fillet (in %) formed between the brazing sheet and an AA3003 strip.

| Sample | Combination of layers | Fillet formation |
|---|---|---|
| 1 | C1/B2 | 0% |
| 2 | A/C1/B2 | 25% |
| 3 | A/C2/B2 | 30% |
| 4 | C3/B2 | 5% |
| 5 | A/C3/B2 | 100% |
| 6 | A/C4/B2 | 85% |
| 7 | A/C1/B1 | 0% |
| 8 | A/C2/B1 | 25% |
| 9 | A/C3/B1 | 85% |
| 10 | A/C4/B1 | 50% |

From the results of Table 2 it can be seen that if there is no top layer on the brazing material (Sample 1) there is no formation of a fillet under controlled atmosphere condition when no flux is applied. Applying a thin covering layer according to the invention improves brazeability (Sample 2).

The results of Sample 7 show that if no Mg present in the brazing sheet product there is also no formation of a fillet under controlled atmosphere condition when no flux is applied. Some addition of Mg in the Si clad (Al—Si alloy brazing material cladding) in combination with a thin covering clad (thin covering cladding) further improves brazeability (Samples 3 and 8). However, the Mg content in the brazing material should not be too high if one is to obtain a good fillet formation (Samples 3 and 8). Further improved results are obtained when the Si clad contains in combination Bi and Mg in the claimed range together with a thin covering layer (Samples 5 and 9).

Addition of Ti made brazeability less compared to the non-Ti containing clad alloys (Samples 6 and 10). However, Ti may be added to improve on the corrosion resistance of the brazing sheet product.

EXAMPLE 2

1 mm brazing sheet products similar to Samples 5 and 9 of Example 1 have been shaped and applied in an assembly of components forming an oil cooler. This oil cooler was built up from plates which have to braze both internally and also externally. Due to the long brazing cycle it was necessary to flux the outside of the oil cooler to facilitate brazing by avoiding excessive oxidation, whereas the inner surfaces of the oil cooler had not been fluxed. The oil coolers had been brazed in an industrial scale controlled atmosphere brazing furnace.

From observations it became clear that Sample 9 gave the best overall results. The non fluxed inner surfaces and fluxed outside surfaces showed nice round fillets which will provide amongst others a better fatigue resistance. Whereas the brazing sheet with substantial amounts of Mg in the core (Sample 5) did braze very well at the inner surfaces but was not compatible with flux resulting in poor fillet formation. The fluxed outer surfaces should an undesirable interaction with the Mg originating from the Mg in the brazing material and Mg originating from the core.

EXAMPLE 3

In a further series of experiments the brazing sheet Sample 9 of Table 2 in Example 1 has been manufactured but with a variation in the Fe-content of the brazing material, namely Fe-contents of 0.1%, 0.2% and 0.3% have been manufactured and tested in one and the same brazing cycle.

It has been found that number of FeMnSiAl-type particles in the fillet increases with increasing Fe content. However, the size and shape of the fillet itself is not influenced by the Fe-concentration. Nor has an influence been found on the formation of the fillet itself.

Having now fully described the invention, it will be apparent to one of ordinary skill in the art that many changes and modifications can be made without departing from the spirit or scope of the invention as herein described.

The invention claimed is:

1. An aluminium alloy brazing sheet comprising:
a thin covering material layer,
a core material layer, and
an Al—Si alloy brazing material layer as an intermediate material interposed between said thin covering material and said core material,
said thin covering material and said core material being comprised of aluminium alloys having a solidus temperature higher than a liquidus temperature of said brazing material so that the molten brazing material seeps onto a surface of said thin covering material when said brazing material is molten in a brazing operation,
wherein said Al—Si alloy brazing material contains from 0.01 to 0.06 Mg, and
wherein the aluminium alloy brazing sheet has a total Mg-content of less than 0.06%.

2. The aluminium alloy brazing sheet according to claim 1, wherein said thin covering material has a thickness which is 0.1 to 10% of the entire thickness of said aluminium alloy brazing sheet, and said Al—Si alloy brazing material layer has a thickness which is 5 to 20% of the entire thickness of said aluminium alloy brazing sheet.

3. The aluminium alloy brazing sheet according to claim 2, wherein the thickness ratio of the Al—Si alloy brazing material layer and the thin covering material is 4 or more to 1.

4. The aluminium alloy brazing sheet according to claim 1, wherein the Al—Si alloy brazing material layer further contains one or more wetting elements selected from the group consisting of Bi, Pb, Li, Sb, and Th, and wherein the total amount of the wetting elements is in a range of 0.01 to 0.5%.

5. The aluminium alloy brazing sheet according to claim 1, wherein the Al—Si alloy brazing material layer further contains Bi in a range of 0.01 to 0.5%.

6. The aluminium alloy brazing sheet according to claim 1, wherein the Al—Si alloy brazing material layer further contains one or more elements selected from the group consisting of 0.1 to 5% of Zn, 0.01 to 0.5% of In, and 0.01 to 0.5% of Sn.

7. The aluminium alloy brazing sheet according to claim 1, wherein the core material layer contains Mg in a range of up to 0.03%.

8. The aluminium alloy brazing sheet according to claim 7, wherein the core material layer is an aluminium alloy comprising, in wt.:
Mn 0.5 to 2.0
Cu 0 to 1.2
Fe 0 to 1.0
Si 0 to 1.0
Bi 0 to 0.1
Ti 0 to 0.1
Mg 0 to 0.03,
other elements and inevitable impurities, each <0.05, total <0.2, balance aluminium.

9. The aluminium alloy brazing sheet according to claim 1, wherein the Al—Si alloy brazing material layer further contains one or more wetting elements selected from the group consisting of Pb, Li, Sb, and Th, and wherein the total amount of the wetting elements is in a range of 0.01 to 0.5%.

10. The aluminium alloy brazing sheet according to claim 1, wherein the thin covering material layer is an Mg-free aluminium alloy comprising, in wt. %:
Fe 0 to 0.5
Si 0 to 4.0,
Mn 0 to 1.0
Cu 0 to 0.5
Zn 0 to 0.25
Ti 0 to 0.1
other elements and inevitable impurities, each <0.05, total <0.15, balance aluminium.

11. The aluminium alloy brazing sheet according to claim 1, wherein the thin covering aluminium alloy layer is an Mg-free aluminium alloy having a composition within the range of an AA1000-series aluminium alloy.

12. A brazed assembly of components using an aluminium alloy brazing sheet according to claim 1.

13. A brazed assembly according to claim 12, wherein the brazed assembly is an oil cooler.

14. A method of manufacturing an assembly of brazed components, the method comprising the steps of:
  i. forming the components of which at least one is made from an aluminium alloy brazing sheet according to claim 1;
  ii. assembling the components into an assembly;
  iii. brazing the assembly without applying flux in an inert gas atmosphere at a brazing temperature for a period long enough for melting and spreading of the filler material;
  iv. cooling the brazed assembly.

15. The aluminium alloy brazing sheet according to claim 1, wherein the aluminium alloy brazing sheet has a total Mg-content of less than 0.04%.

16. The aluminium alloy brazing sheet according to claim 1, wherein the Al—Si alloy brazing material layer further contains Bi in a range of 0.01 to 0.1%.

17. The aluminium alloy brazing sheet according to claim 1, wherein the core material layer contains Mg in a range of at most 0.015%.

18. The aluminium alloy brazing sheet according to claim 8, wherein the core material layer contains Mg in a range of at most 0.015%.

19. The aluminium alloy brazing sheet according to claim 1, wherein the Al—Si alloy brazing material layer has a Mg content in the range of 0.02 to 0.06%.

20. The aluminium alloy brazing sheet according to claim 10, wherein the thin covering material layer has a Si content in the range of 0 to 1.0%.

* * * * *